United States Patent [19]

Boussageon

[11] 4,009,068
[45] Feb. 22, 1977

[54] HIGH-FREQUENCY BONDING APPARATUS
[75] Inventor: Pierre Boussageon, Paris, France
[73] Assignee: Societe Generale pour l'Emballage, Paris, France
[22] Filed: Feb. 20, 1976
[21] Appl. No.: 659,955

Related U.S. Application Data
[63] Continuation-in-part of Ser. No. 551,329, Feb. 20, 1975.
[52] U.S. Cl. .............................. 156/380; 219/10.69; 219/10.81
[51] Int. Cl.² .................. B32B 19/02; H05B 9/04
[58] Field of Search .................. 156/380, 273, 272; 219/10.73, 10.75, 10.69, 10.81

[56] References Cited
UNITED STATES PATENTS

| | | | |
|---|---|---|---|
| 2,903,041 | 9/1959 | Jones et al. | 156/380 |
| 3,006,801 | 10/1961 | Pfeffer | 156/380 |
| 3,357,108 | 12/1967 | Bennett | 219/10.69 |

Primary Examiner—Douglas J. Drummond
Attorney, Agent, or Firm—Pennie & Edmonds

[57] ABSTRACT

A rotating platform carries circumferentially spaced presses having bonding electrodes. A pair of stationary inductors, preferably arcuate plates, are connected to a high frequency generator. The electrodes of respective presses are connected to respective pairs of movable inductors which overlap the stationary inductors successively as the presses pass thereby, and provide capacitive couplings to supply high frequency energy to the presses successively to bond the material held by the presses. The overlapping portions of the fixed and movable inductors are of different circumferential length which, together with the rotation, controls the length of the bonding periods and automatically switches the bonding current from one press to the next. Odd numbers of overlapping plates for the capacitive couplings are provided, particularly three plates. The movable inductors are advantageously attached to the jaws of the presses.

9 Claims, 5 Drawing Figures

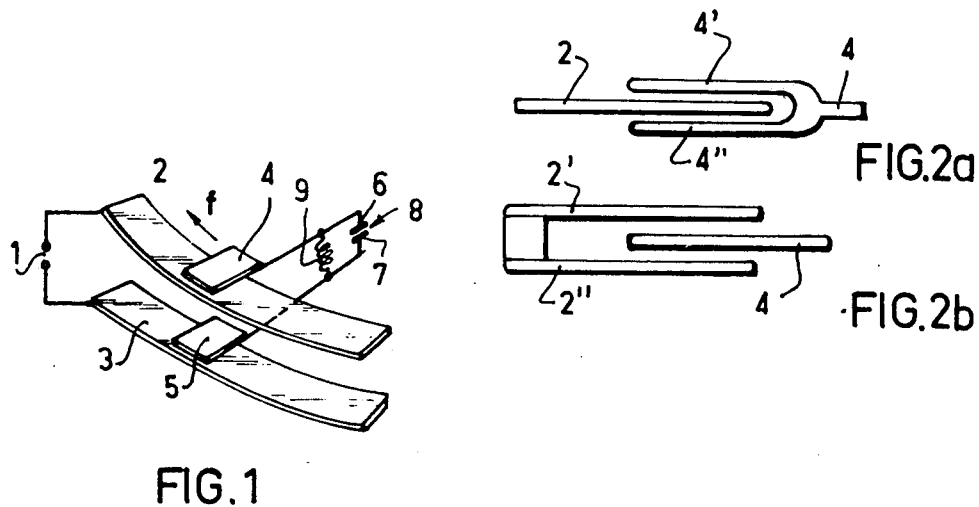
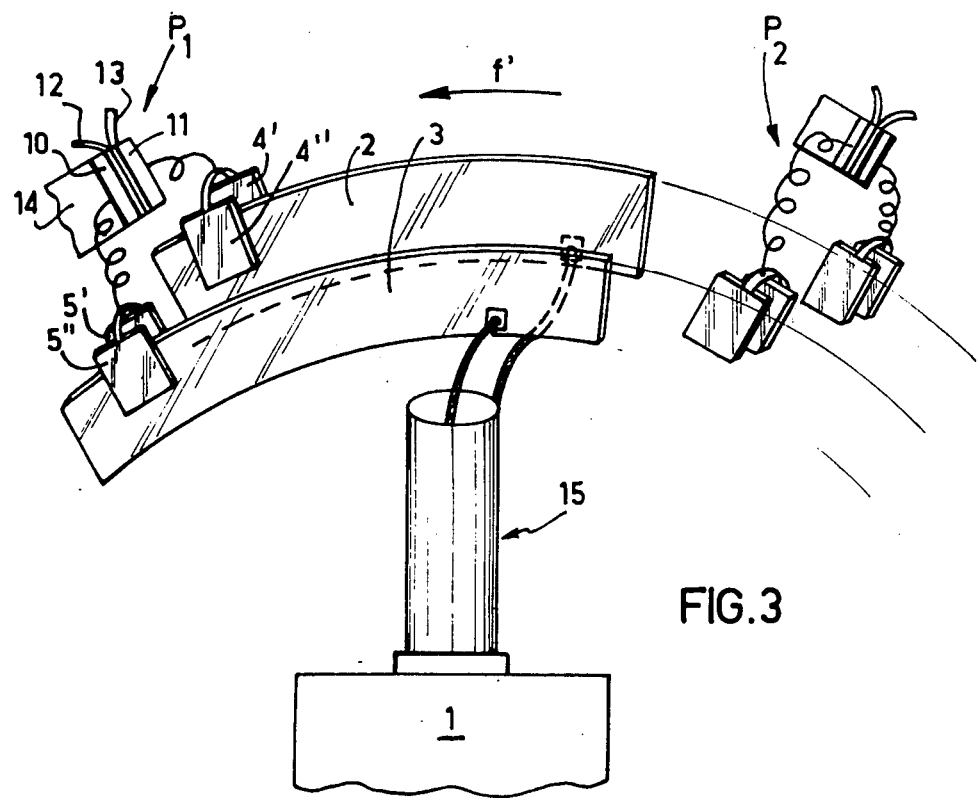

HIGH-FREQUENCY BONDING APPARATUS

This application is a continuation-in-part of U.S. patent application Ser. No. 551,329, filed Feb. 20, 1975.

The present invention relates to high frequency thermobonding apparatus for bonding thin elements such as plastic sheets, the edges of containers, for example yogurt containers, tubes of toothpaste, etc.

There are two known types of high frequency bonding methods, namely, induction bonding which commonly employs frequencies of the order of 1 MHz and bonding by means of dielectric losses which commonly employs frequencies of 10–15 MHz and higher.

In the packaging industry it is frequently necessary to bond a polyolefin paper complex sheet, for example to form hollow containers. Bonding is effected by overlapping the parts of the sheet to be bonded and by fusing the opposite layers of plastic material. The parts to be bonded are pressed firmly against each other by means of the jaws of a pressing unit and are heated and bonded by the dielectric losses produced by the action of a high frequency current applied to electrodes provided on the pressing unit.

A bonding device is known wherein the articles to be bonded are placed on a platform adapted to be rotated into a plurality of positions in which the articles are subjected to various forming and bonding operations. The bonding operation is carried out when the platform is stationary by means of a stationary press, the electrodes of which are connected directly to the terminals of a high frequency current generator. Thus, the electrodes constitute the plates of a charging capacitor, of which the polyolefin paper is the dielectric.

In the case of another known bonding device having a rotating platform, each article is gripped in a mobile press which closes independently of the bonding operation. A high frequency current feed head having a system of contacts which close on the mobile press the instant it stops in the work position, can be provided for each stopping position. In this way, an article can be supplied with a plurality of high frequency current pulses at the successive stopping positions. As a result, the stopping periods are reduced and the rate of operation is higher than that of the first above-mentioned system.

However, these two types of bonding devices have certain disadvantages. Firstly, the heat application periods are limited to the stopping periods of the rotating platform which tends to limit production and, secondly, when the application of power takes place over several stopping periods of the pressing means mounted on the rotating platform, it is necessary to mount in parallel charging circuits having different characteristics, thus making it difficult to syntonize them. It will be noted that in the case of the two prior art bonding devices, it is necessary to carry out the bonding operation in a fixed position, owing to the fact that it would be impossible to transmit high frequency current through the contacts if the platform did not stop.

The present invention relates to a bonding device which comprises a rotating platform on which a plurality of presses are mounted, wherein the bonding operation can be carried out without stopping the platform. The apparatus according to the invention comprises stationary high frequency inductor means, the terminals of which are connected to a high frequency current generator mounted in a fixed position, and a plurality of movable inductor means mounted on the platform and electrically connected to the electrodes of the respective presses. The plurality of movable inductor means pass the stationary inductor means successively in overlapping relationship and couple the inductor means so that high frequency energy is supplied to the electrodes of the presses successively to bond the material held by the presses. The successive energization automatically switches the bonding operation from one press to the other.

In the case of a preferred embodiment of the invention, in which bonding is produced by dielectric losses, the stationary inductor means comprises two parallel inductors which are electrically connected to the terminals of the high frequency generator, and the movable inductor means comprises two spaced inductors overlapping the respective fixed inductors in spaced relationship therewith. In this manner, two capacitors are obtained which provide capacitive coupling of the generator and the bonding station. The coupling can be increased by arranging the overlapping portions of the inductors to define a plurality of parallel plates, the total number of plates in each capacitor preferably being an odd number so that the capacity is not a function of variations in the separation of the plates as the platform rotates.

The invention will now be described with reference to the accompanying drawings, in which:

FIG. 1 is a schematic, perspective view of bonding apparatus operating by way of dielectric losses, according to the invention;

FIGS. 2a and 2b represent two different embodiments of the coupling between the stationary and movable inductors of the apparatus;

FIG. 3 is a partial perspective view showing a plurality of bonding positions.

Figure 4:
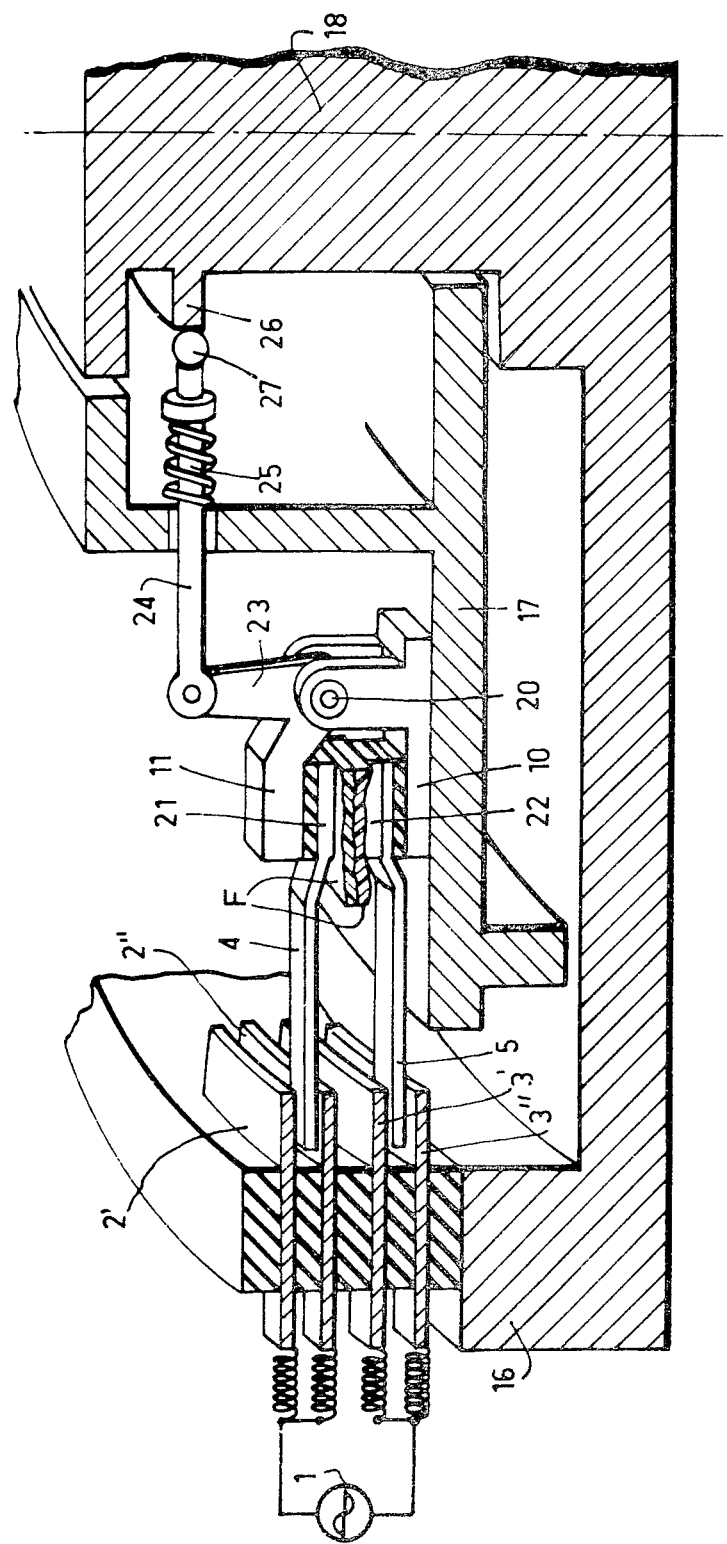
FIG. 4 is a sectional view of a specific embodiment of apparatus according to the invention.

Referring to FIG. 1, the bonding apparatus comprises a high frequency generator 1, the terminals of which are connected to two stationary arcuately shaped inductors 2, 3, and two movable inductors 4, 5 which have a smaller surface area and are respectively disposed opposite to and a short distance from the stationary armatures 2, 3 so as to produce a capacitive coupling therebetween. The movable inductors 4, 5 are electrically connected to two gripping elements 6, 7 of a bonding press. Means (not shown in FIG. 1) cause the gripping elements of the press to be tightened at the desired time. Thus, from an electrical point of view, the press is then comparable to a capacitor 8, the dielectric of which consists of the article to be bonded which is held between the gripping elements 6, 7, for example a polyethylene paper complex. It comprises an inductance coil 9 for syntonizing the circuit.

By virtue of the capacitive coupling which is produced, movable inductors 4, 5 form two coupling capacitors with the stationary inductors 2, 3 each time they overlap the latter. The movable inductors are rotated in the direction of the arrow $f$ so as to sweep the entire surfaces of the stationary inductors. While the capacitive coupling is effective, the passage of high frequency current in the syntonized circuit causes the paper to be heated and thus produces fusion and bonding of the layers which are in contact with one another.

The capacitive coupling is increased if the overlapping portions of the inductors define a plurality of plates. In addition, the capacity of the capacitor is defined with greater precision if the overlapping portions define an odd number of plates, those in one set surrounding those in the other set. Two possible arrangements are shown in the drawings. FIG. 2a illustrates an embodiment wherein the stationary inductor 2 is a single element and the movable inductor 4 consists of the plates 4', 4'' overlapping the inductor 2 on opposite sides thereof. The stationary inductor 3 and the movable inductor 4 also have a similar configuration. FIG. 2b shows an embodiment wherein the movable inductor 4 is a single element and passes between two plates 2', 2'' forming a double stationary inductor.

Couplings of this type ensure a programmed distribution of energy since this is transmitted only during the time that the movable inductors are opposite the fixed inductors. This time can be controlled by appropriate choice of the length of the stationary inductors. The form of the pulse depends on the relative lengths of the inductors.

The above description relates to flat inductors which are the most advantageous arrangement. However, the description would also be applicable if the inductors were cylindrical. Likewise, it is apparent that the inductors 2 and 3 may be movable and inductors 4 and 5 stationary, since the important feature is the relative movement between these sets of inductors.

FIG. 3 shows apparatus comprising a plurality of bonding positions spaced circumferentially in a circle, only two of which — P1 and P2 — have been shown in order to simplify the drawing. The bonding devices P1 and P2 rotate in the direction of the arrow f. Each of the bonding devices comprises two movable inductors each having two plates 4', 4'' and 5', 5'', which are electrically connected to the gripping elements 10, 11 of a press between which the two pieces of the polyethylene paper complex to be bonded, 12, 13, are gripped. The gripping element 10 is mounted on a support 14 and the gripping element 11 is displaceable with respect to element 10 by drive means (not shown in this figure). The inductors 4', 4'' and 5', 5'' move along the two arcuately shaped stationary inductors 2, 3. The sleeve and core of the output coaxial line 15 of a high frequency current generator 1 are connected, respectively, to the stationary inductors 2, 3.

To enable the energy produced by the generator 1 to be concentrated at a single bonding station, the length of the stationary inductors 2, 3 will be selected in such a way that they are never simultaneously overlapped by the movable inductors of two successive bonding devices. The duration of the bonding operation is determined by the rate of rotation once the relative circumferential lengths of the overlapping inductors have been determined.

FIG. 4 represents an embodiment of the device according to the invention. Two stationary inductors, each consisting of two plates 2', 2'' and 3', 3'', are mounted on the periphery of a cylindrical frame 16. A horizontal platform 17 carrying a series of bonding devices (only one of which is here shown) is rotatably mounted on a central column 18. The bonding device comprises a lower gripping element or jaw 10 which is attached to the platform 17 and a movable gripping element or jaw 11 which is hinged on the axis 20 relative to the gripping element 10. Two radial inductors 4 and 5, the ends of which terminate between the plates 2', 2'' and 3', 3'', are attached to the gripping elements. The plates 2', 2'' and 3', 3'' are electrically connected to a high frequency current generator 1 and the bonding electrodes 21 and 22 are integral with the inductors 4 and 5. The bonding electrodes are insulatedly attached to the gripping elements 10 and 11. The movable jaw 11 has a lever arm 23 pivoted to a rod 24. A compression spring 25 pushes back the rod 24, and thus urges the lever 23 and the gripping element 11 to the open position. As the device approaches the bonding position, a cam 26 acting on a roller 27 disposed at the end of the rod 24 causes the press to be closed on the two sheets F to be bonded, and simultaneously brings the inductor 4 into the position shown in FIG. 4. Thus both inductors 4, 5 move between the plates 2', 2'' and 3', 3'' of the stationary inductors. As the inductors overlap, the circuit with the high frequency generator is closed, thereby initiating the bonding operation. As the free ends of inductors 4, 5 pass by the stationary inductors, the circuit with the high frequency generator is automatically broken. The bonding operation at the next bonding device circumferentially spaced on the platform 17 then proceeds.

It will be understood from FIG. 3 that in FIG. 4 the free ends of each inductor 4, 5 can be provided with double plates and single plates employed for the fixed inductors.

The following table provides additional information for the bonding apparatus, according to the material to be bonded. It will be understood that this information is for illustrative purposes only.

| Features | Double-faced Polyethylene paper 40/100 | Semi-rigid PVC 30/100 | Rigid PVC 25/100 |
| --- | --- | --- | --- |
| Bonding Surface | 100 mm × 10 mm = 1000mm² | 150 × 4 = 600 mm² | 200 × 2 = 400 mm² |
| Inductor Surface | 8000 mm² | 8000 mm² | 8000 mm² |
| Plate Thickness | 4 mm | 4 mm | 4 mm |
| Spacing of Inductors | 2 × 2 mm | 2 × 2 mm | 2 × 2 mm |
| Bonding Pressure | 120 kg | crushing limit | crushing limit |
| Bonding duration | 0.2 s | 0.1 s | 0.1 s |
| Requisite Power | 1000 Watts | 500 Watts | 800 Watts |

I claim:
1. High-frequency bonding apparatus which comprises a rotating platform carrying a plurality of circumferentially spaced presses, each of said presses having electrode means for bonding material held thereby, stationary high frequency inductor means adjacent said rotating platform, a high frequency generator connected to said stationary inductor means, and a plurality of movable inductor means mounted on said platform, said movable inductor means being connected with the electrodes of said presses respectively and extending in position to overlap said stationary inductor means successively as said presses pass thereby and couple the inductor means of the presses with the stationary inductor means to supply high fre- quency energy to the electrodes of the presses successively for bonding the material held by the presses.

2. Apparatus according to claim 1 in which said stationary inductor means includes two parallel spaced inductors and said movable inductor means includes two spaced inductors overlapping respective fixed inductors in spaced relationship therewith to form capacitor couplings therewith as the movable inductor means passes by the stationary inductor means.

3. Apparatus according to claim 2 in which the overlapping portions of each stationary inductor and the corresponding movable inductor define an odd number of plates for the corresponding capacitor coupling.

4. Apparatus according to claim 3 in which the overlapping portions of each stationary inductor and the corresponding movable inductor define a single plate for one inductor and two plates for the other inductor on opposite sides of the single plate.

5. Apparatus according to claim 2 in which the inductors of one of said stationary and movable inductor means are arcuate and have a greater circumferential length than the inductors of the other.

6. Apparatus according to claim 5 in which the overlapping portions of the inductors are flat.

7. Apparatus according to claim 2 in which said platform is continuously rotated, each of said presses has a pair of relatively movable gripping elements and the two inductors of each movable inductor means are attached to the respective gripping elements of the corresponding press, and the inductors of said stationary inductor means are arcuate and have a greater circumferential length than the inductors attached to the gripping elements.

8. Apparatus according to claim 7 in which the inductors of the stationary inductor means include two pairs of inductors, the inductors of each pair being spaced to allow the passage therebetween of a respective inductor attached to said gripping elements.

9. Apparatus according to claim 8 in which each inductor attached to said gripping elements has spaced plates at the free end thereof between which the corresponding inductor of the stationary inductor means passes.

\* \* \* \* \*